United States Patent [19]

Hughes

[11] Patent Number: 5,697,372
[45] Date of Patent: Dec. 16, 1997

[54] METHOD AND APPARATUS FOR ULTRASOUND SCANNING

[75] Inventor: David Ian Hughes, Chippenham, United Kingdom

[73] Assignee: Systems Engineering & Assessment Limited, United Kingdom

[21] Appl. No.: 557,136
[22] PCT Filed: Jun. 10, 1994
[86] PCT No.: PCT/GB94/01260
  § 371 Date: Dec. 8, 1995
  § 102(e) Date: Dec. 8, 1995
[87] PCT Pub. No.: WO94/29743
  PCT Pub. Date: Dec. 22, 1994

[30] Foreign Application Priority Data

Jun. 10, 1993 [GB] United Kingdom ............ 9311975

[51] Int. Cl.⁶ ..................................... A61B 8/00
[52] U.S. Cl. ..................... 128/660.06; 128/660.07
[58] Field of Search ............ 73/631; 128/660.05–660.09

[56] References Cited

U.S. PATENT DOCUMENTS 4,608,868  9/1986  Green .
4,788,981  12/1988 Nagasaki et al. ............. 128/660.07
5,361,767  11/1994 Yukov ........................... 128/660.06

*Primary Examiner*—Marvin M. Lateef
*Assistant Examiner*—Derrick Fields
*Attorney, Agent, or Firm*—Gifford, Krass, Groh, Sprinkle, Patmore, Anderson & Citkowski, P.C.

[57] ABSTRACT

A method and apparatus for compensating for the effects of variable attenuation in a body being scanned by an ultrasound pulse echo scanner in which a compensation signal is derived on the basis that the signal strength of the received signal at any time instant after generation is influenced by both attenuation and back scatter. The apparatus comprises an array of transducers which generate a received signal from an echo, for applying a time-dependent gain to produce a signal which is a function of the received signal, temporary storage and integrator functions operable to sum the signal values for each time instant from a commencement point, the combining of the integrated signal with the stored original signal to form a quotient, and the displaying of the signal thus generated.

13 Claims, 2 Drawing Sheets

METHOD AND APPARATUS FOR ULTRASOUND SCANNING

BACKGROUND OF THE INVENTION

The present invention relates generally to ultrasound scanning.

Images produced by transmission of ultrasonic pulses through tissue, and generated from reflected echoes can be directly displayed in real time. Ultrasonic scanning constitutes a valuable non-invasive diagnostic tool for gaining information concerning the interior structure of a body. In medical applications, where the "body" may be a living human or animal body, inhomogeneity of the tissue causes different degrees of attenuation and backscatter of the ultrasonic signal which result in a medically unsatisfactory displayed image.

Known ultrasonic scanners typically have a transducer (which may in practice comprise a plurality of individual transducer elements in a linear or annular array), operated to transmit and receive ultrasonic pulse signals. Ultrasonic pulses transmitted from an individual transducer element into the body, reflected at points therein and received by the same transducer element provide information on the interior structure of the body in a line extending into the body from the transducer element. Such a one-dimensional line of information is referred to as an A-scan. A two-dimensional image, referred to as a B-scan can be generated by scanning a transducer generating successive A-scan lines. Such scanning may be achieved by physical displacement of an individual transducer (that is a transducer comprising a single transducer element) or by electronic scanning in the case of a transducer comprising an array of individual transducer elements. A B-scan image therefore represents a section through the body passing through the line defined by the transducer (if it comprises an array of transducer elements) or by the path traversed by an individual transducer, which, upon display on for example a video monitor screen, can be used to visualise the interior structure of the body.

In order to normalize the display, and to take account of the fact that in a homogeneous body the echo signals from points deeper into the body will be more strongly attenuated due to the greater path length which they have travelled, it is normal to subject the received signals to an amplification with a time-dependent gain. The gain function of such known instruments, which effectively varies the gain as a function of depth, is based on average material properties. In a real life situation, however, where there are localized regions (such as cartilage or amniotic fluid) which may have greater or lesser attenuation than the assumed average, the time-dependent gain variation function is incorrect. Thus, although some compensation may be obtained by progressively increasing the receiver gain for signals from greater ranges it must be accepted that no simple compensation function may accommodate the possible variations in tissue structure and that the normal practice of applying the same gain function repeatedly is a compromise which, while it offers a degree of improvement over the uncorrected signal, is still far from perfect.

Although known scanners are provided with means for tuning or varying the gain function slightly in order to optimize the image, in other words to take account of the physical features within the actual body being examined, even when they are adjusted to obtain the best results the image includes image artifacts in the form of shadows, namely areas which are darker, in relation to the surrounding image, than the general level of the image, and "enhancements" or "inverse shadows", which are areas of greater brightness than the correct brightness for that area. It is observed that the "shadows" appear behind physical features which attenuate the energy in the transmitted ultrasonic pulse more strongly, such as cartilage tissue, whereas the "enhancements" appear behind (that is more deeply within the body in the direction of the section from the surface) physical features which attenuate the energy less strongly, such as cysts or amniotic fluid.

It will be appreciated that the image presented to the operator by ultrasonic scanning equipment is principally the result of two physical phenomena related to the transmission of sound through solids and liquids constituting the body under examination. The first of the physical phenomena is the attenuation of the sound energy as it is transmitted through the material itself, and the other is the backscatter or reflection of the sound energy at an interface between two materials having different properties. Backscatter is the principal factor influencing the arrival of the echo signal since, unless it were reflected, the pulse would continue in the same direction and no echo signal would be received, whereas the attenuation phenomenon strongly influences the resultant amplitude of the received signal. There are other factors which influence the received signal. These include the effects of interference due to the coherent nature of sound waves, which results in a "speckle" appearing in the final image; refraction due to variations in the velocity of sound at an interface between the different tissues, which can cause distortion in the image or multiple images; and the variation in the attenuation and backscatter of sound in dependence on the frequency of the sound signal. Ultrasonic pulses generated by most existing scanners are composed of a range of frequency components which results in the pulse shape being altered due to the different behaviour of different frequency components. These, however, are second-order effects in comparison with the attenuation and backscatter.

In known machines it is assumed that the backscatter and attenuation are independent from one another. On this assumption the time-varying gain applied to the received signal in order to compensate for the effects of attenuation is the same for all A-scan lines regardless of location. It is believed, however, that the backscatter and attenuation are not entirely independent from one another and that the application of an unmodified or uncompensated time-varying gain to the signal is, in fact, a major reason for the appearance of the shadowing and enhancement effects referred to above.

Attempts have been made to improve the imaging signal over that using a conventional time gain control. One of these attempts involves examining peak signals in a number of range segments, and anticipating the required gains from a progressively updated store. In this known system, detector output is sensed in an integrated peak detector rather than a smoothing filter and the peak value derived in each segment of the total range is held in a corresponding storage capacitor. After some number of complete image formations these capacitors will hold a voltage derived from the complete set of signals in a given range segment of the imaged slice. The gain control function is then derived by reading out the value stored for each range segment, modified by simultaneously weighting a portion of the value for the next segment so that the control is weighted by the echo history over the total spatial extent of the range segment, by the previous range behaviour held by a filter, and by the anticipated behaviour held in the next storage capacitor. This, however, takes several seconds, and therefore cannot be used in a real time display instrument.

Because the same time-varying gain is applied to each A-scan line making up a two-dimensional B-scan image, no allowance can be made for variation in attenuation properties in the direction perpendicular to the A-scan lines. However, the attenuation in a body is not necessarily constant so that application of a predetermined time gain function represents a compromise necessary due to the fact that the variation in attenuation is an unknown.

The present invention seeks to provide a method and means for compensating the effects of variable attenuation in a body being scanned by an ultrasound pulse echo scanner, and in particular a method and means by which the shadowing and enhancement appearing in the images produced by conventional pulse echo scanners can be reduced if not entirely eliminated.

SUMMARY OF THE INVENTION

According to one aspect of the present invention, therefore, a method of compensating for the effects of variable attenuation in a body being scanned by an ultrasound pulse echo scanner comprises the generation of a compensation signal derived from the received signal by determining, for any time instant in the received signal, the sum of the values of a function of the received signal, over a time interval commencing with the said time instant, and generating a display signal which is the quotient of a function of the received signal and the compensating signal.

The function of the received signal may, of course, be the identity function.

The theoretical considerations underlying this method will be discussed in more detail below. In practice, the said received signal may be temporarily stored while the values of the said compensation signal are being determined.

The compensation signal is derived on the basis that the signal strength of the received signal at any time instant after generation is influenced by both attenuation and backscatter, and that there is a linear or non-linear relation between backscatter and attenuation in the medium through which the pulse is transmitted.

It is this realization that a relationship exists between backscatter and attenuation which underlies the method and apparatus of the present invention.

According to another aspect of the invention apparatus for producing ultrasound images of a body under examination comprises a transducer means for generating a pulse signal to be transmitted by the said transducer, and received thereby as an echo signal after reflection within the body under examination, to generate a received signal for producing an A-scan which, in combination with signals from other such A-scan lines forms a B-scan of the body under examination, in which there are provided means by which image artifacts in the B-scan signal are at least reduced by combination of a function of the received signal with a compensation signal derived by integration of a function of the received signal over a finite time period to form a quotient signal for application to display means for displaying the image thus produced.

The apparatus of the present invention may include temporary storage means for storing the said received signal, integration means for integrating the received signal over a finite time period, and divider means for dividing the said received signal by the said integrated compensation signal to produce the output signal for application to the said display means.

The present invention also comprehends apparatus for use in association with an existing ultrasound scanner for developing a compensated B-scan signal from a signal extracted from the scanner itself.

Embodiments of the present invention will now be more particularly described, by way of example, with reference to the accompanying drawings, in which:

DESCRIPTION OF THE PREFERRED EMBODIMENTS

Figure 1:
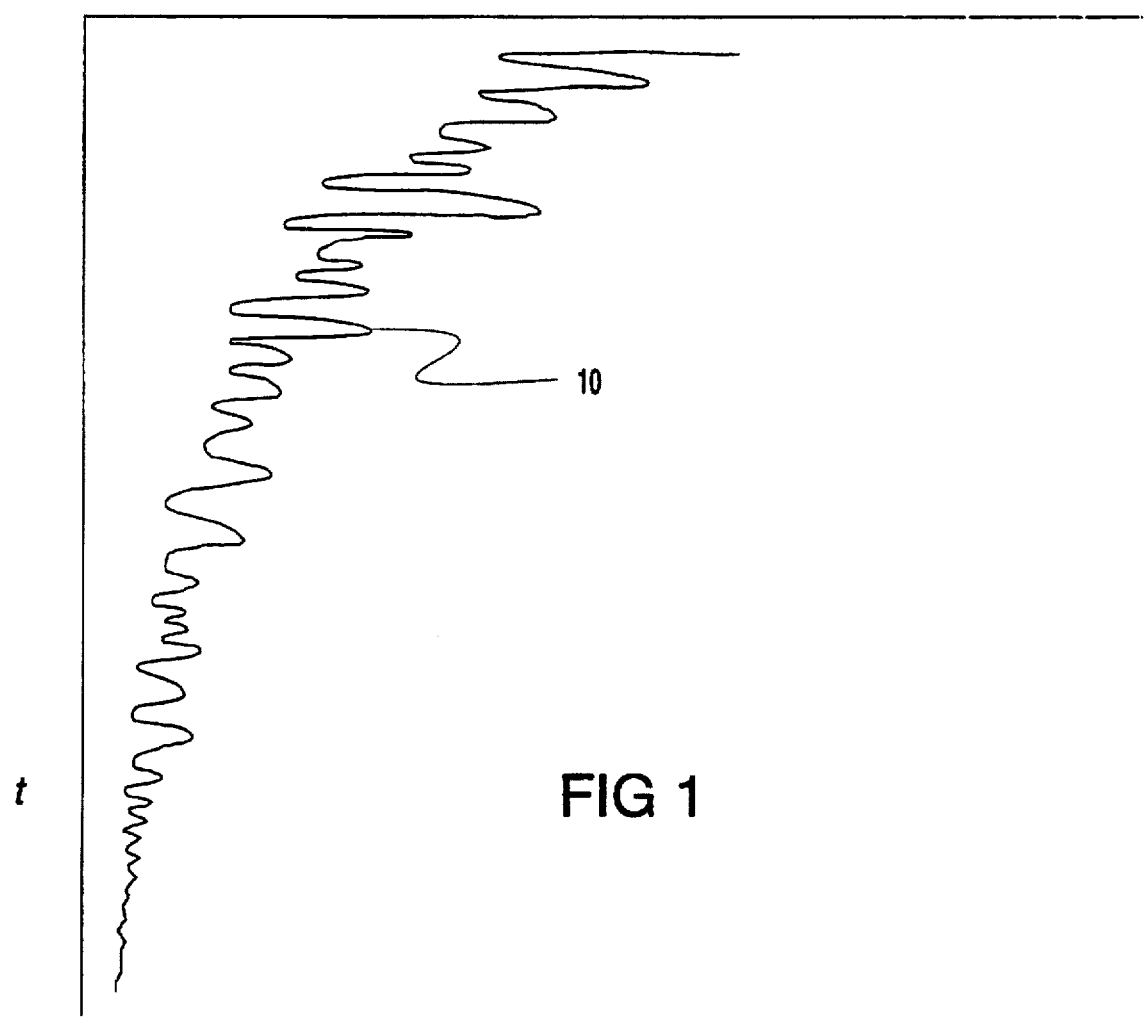
FIG. 1 is a diagram representing the variation of a received ultrasonic signal with time.

First, consider a coordinate system set up so that a transducer at the origin transmits a sound pulse along the x axis at the velocity of sound, c. A sound pulse transmitted from the transducer travels in the positive x direction. In travelling from the point x to the point x+δx the signal is attenuated by the tissue between these two points. If δx is assumed to be small it can be assumed that the properties of the tissue remain constant in this small region. The attenuation in the signal strength as the pulse passes between the point x and the point x+δx is expected to be proportional to the distance δx. It will also depend on the attenuation properties of the tissue represented as the quantity a(x) which represents the fraction of the signal which is removed, per unit distance, during transmission between x and x+δx. The possible values of a(x) thus lie between 0 and 1.

Denoting the amplitude of the pulse when it gets to the point x by S(x), $$S(x+\delta x) = (1 - a(x)\delta x)S(x)$$

Dividing by δx and taking limits as δx→0 gives $$\frac{dS(x)}{dx} = -a(x)S(x)$$

which can be solved to give $$S(x) = S(x_0)\exp\left(-\int_{x_0}^{x} a(u)du\right)$$

which relates the amplitude at the point x to the amplitude at some other point, $x_0$.

At any point x some fraction of the signal will be scattered in a direction such that it is received again by the transducer. If the signal strength at point x is S(x) then:

$$b(x)S(x) \quad (0 \leq b(x) \leq 1)$$

is the fraction of signal which, after further attenuation on the return trip, arrives back at the transducer. If it is assumed that the attenuation properties of the tissue are directionally independent, then the signal strength, $S_r$, received at the transducer after having been scattered once at point x is given by $$S_r(x) = Sb(x)\exp\left(-2\int_0^x a(u)du\right)$$

where S measures the amplitude of the pulse produced by the transducer and the factor of 2 is due to attenuation taking place during both the outward and return trip. Since the velocity of sound is assumed to be constant $x=ct/2$ where $t$ is the time delay between transmission and reception.

In the case of a B-scan, that is a set of A-scans in a y direction transverse to the A-scan or x direction, a and b may depend on both x and y. It should be appreciated here that the term "a y direction" is not intended to limit the transverse direction to a single value but rather to allow it to adopt a plurality of values as may be the case, for example, in the so-called "sector" sweep where the y-direction varies over a small range, or in a more fundamental variation, using internal probes, where the sweep may extend over 360°. The B-scan may be produced from a transducer comprising an array of transducer elements and electronically scanning the output signals, or by displacing a signal transducer element along the y direction to provide a set of A-scan images to make up the B-scan. The quantity $b(x,y)$ is a measure of backscatter, it may include a depth dependence to take account of the effect of spherical spreading of the backscatter pulse before arrival at the transducer. Moreover, whenever in this specification reference is made to a signal it will be appreciated that this is to be understood, where appropriate, to include a reference to a function of the signal.

The received signal is amplified by introducing a time-dependent gain in an attempt to compensate for the effects of the exponential factor in the equation for $S_r(x)$. Typically this compensation is achieved by the equivalent of multiplying the received signal by an exponential function of $t$ (and hence x). The same compensation is applied to each A-scan line in a B-scan with no account being taken for attenuation variation in either x or y directions. If $S_d(x)$ is this amplified signal then $$S_d(x,y) = Sb(x,y)\exp\left(-2\int_0^x a(u,y)du\right)\exp(2Ax)$$

where A is a constant. The ability to vary the value of A is the only adjustment to the time gain that can be made. The effects of shadowing and enhancement of the ultrasonic images occur because the value of A cannot always be chosen so that $Ax$ is a good approximation to $$\int_0^x a(u,y)du$$

for example, taking a single A-scan so that the variable y can be neglected in the equation for $S_d(x,y)$ and choosing units so that $S=1$, then given a sample with constant backscatter $b(x)=b_0$ and constant attenuation $a(x)=a_0$, then the equation for $S_d(x,y)$ gives $$S_d(x) = b_0 \exp(-2a_0 x)\exp(2Ax)$$

if, by adjusting the time gain, A is chosen to equal $a_0$ then $S_d(x)=b_0$ to give a good representation of the backscatter map. Now, if the time gain is left fixed, but the attenuation $a(x)$ is:

$a_1$, if $x_1 < x < x_2$ $a_0$, otherwise

Figure 2:
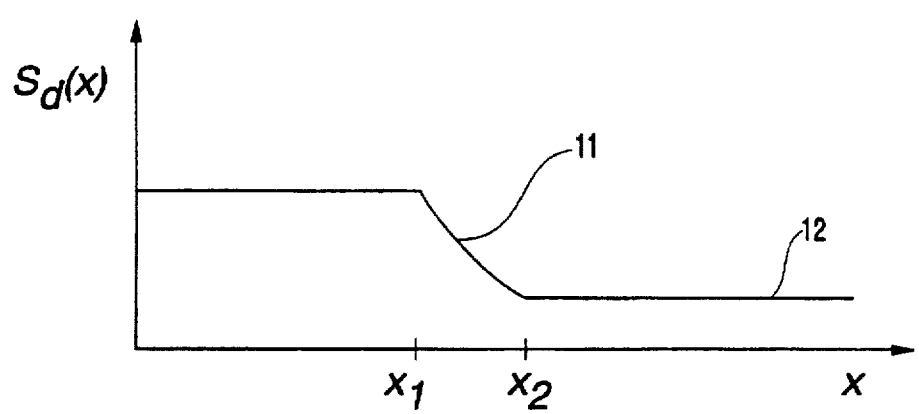
FIG. 2 is a diagram illustrating the formation of the shadowing effect.

This can be considered to be due to the presence of an object which spans the region from $x_1$ to $x_2$. Substituting into the equation for $S_d(x,y)$ gives the results that $S_d(x)$ is:

$b_0$, if $x<x_1$ $b_0 \exp(-(a_1-a_0)(x-x_1))$, if $x_1 \leq x \leq x_2$ $b_0 \exp(-(a_1-a_0)(x_2-x_1))$, if $x_{2<x}$ if $a_1>a_0$ then the signal for $x>x2$ is less than $b0$ giving a shadow behind the object. This is illustrated in FIG. 2 in which the decay in the value of $S_d(x)$ between $x$, and $x_2$, represented by slope 11, is followed by a continuous low value 12 independently of any other attenuation feature.

Figure 3:
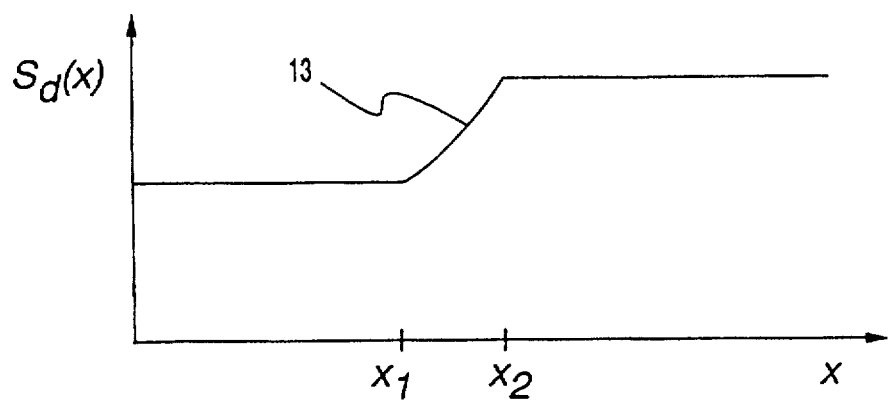
FIG. 3 is a diagram illustrating the formation of the enhancement effect.

On the other hand, if $a_1<a_0$ then the signal is greater than $b_0$ for $x>x_2$ which gives an enhancement behind the object as shown in FIG. 3 where the rising slope 13 is followed, at higher values of x, by an increased value of $S_d(x)$.

In the equation for $S_d(x,y)$ tissue attenuation and backscatter are specified by the quantities $a(x,y)$ and $b(x,y)$ respectively. The image presented to the operator, represented by $S_d(x,y)$, depends on both $a(x,y)$ and $b(x,y)$. It also depends on the strength of the transmitted pulse S and the time gain, which is represented by the constant A.

Since in practice the scanner does not separate out the effects of attenuation and backscatter (equivalent to obtaining both $a(x,y)$ and $b(x,y)$) the only information available is the ultrasound image, $S_d(x,y)$. From the equation for $S_d(x,y)$ it can be seen that performing this task is mathematically equivalent to solving one equation for two unknowns. There is no unique solution to this problem but a solution can be obtained if additional assumptions can be made so that the problem is reduced to solving one equation with a single unknown.

The use of a fixed time gain, as used in most existing equipment, can be considered to be based on an assumption that $a(x,y)$ is constant. Automatic time gain algorithms make different assumptions such as, for example, assuming that $b(x,y)$ is constant. The present invention is based on the proposition that these assumptions oversimplify the case and, worse, introduce their own errors. Instead a relationship between attenuation $a(x)$ and backscatter $b(x)$ is utilized. Taking the simple case of $b(x)=k\,a(x)$ gives:

$$S(x) = ka(x)\exp\left(-\int_o^x a(t)dt\right)$$

so that $$\int_{t=x}^{\infty} S(t)dt = k\exp\left(-\int_o^x a(t)dt\right)$$

from this it can be seen that $$a(x) = \frac{S(x)}{\int_{t=x}^{\infty} S(t)dt}$$

Thus, by dividing the received signal by an integral of the received signal over a range from the point of interest onwards (in practice this will be a finite range even though the upper limit is expressed as $\infty$ in the above expressions) the component dependent on backscatter $b(x)$ is effectively compensated. This result is arrived at by the assumption that the relation between $a(x)$ and $b(x)$ is a simple linear one. In practice, of course the relationship will almost certainly be rather more complex so that, as a general expression, the signal used for display can be represented by $\hat{S}(x)$ where $$\hat{S}(x) = \frac{S(x)}{C(x)}$$

and where S(x) is a function of the received signal, and $$c(x) = \int_{t=x}^{\infty} S(t)dt$$

Figure 4:
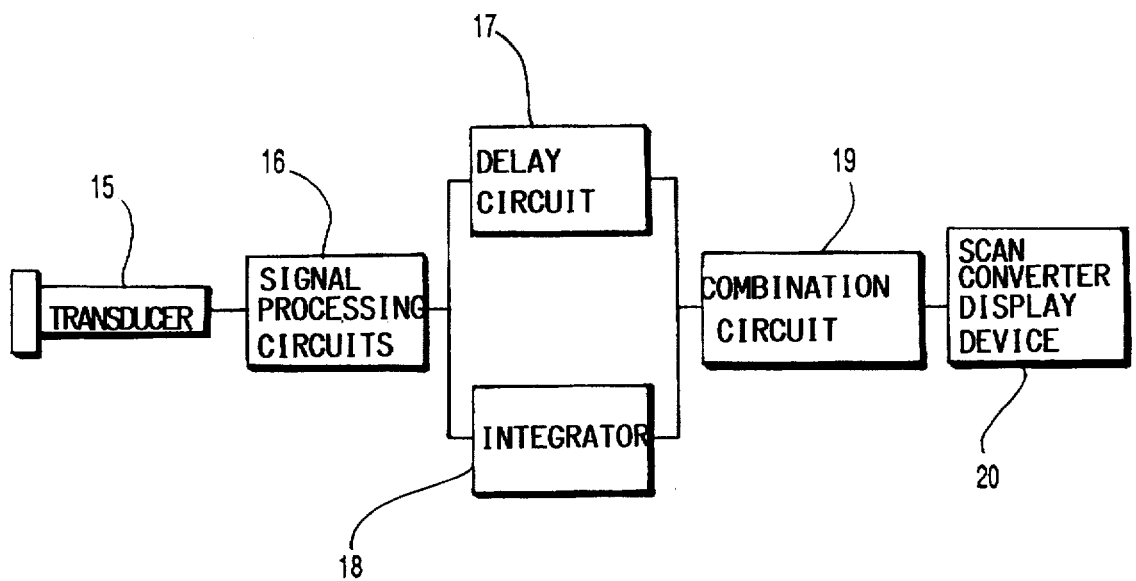
FIG. 4 is a block diagram illustrating the major components in a compensation system formed as an embodiment of the invention.

FIG. 4 illustrates in block diagram form the major components of an ultrasonic scanning system having means for compensating for image artifacts. The system shown comprises a transducer 15, which in practice comprises an array of transducer elements for transmitting and receiving focused ultrasonic pulses into a body (not shown) under investigation. Circuits for generating the transmitted pulse, and for detecting the echo signal, including filtering, pulse shaping and other processing of the signal are not shown since these are conventional on known commercially available ultrasonic scanners.

The signal s(t) from the transducer is fed to preprocessing circuits 16, for example for applying a time dependent gain, again as known in conventional scanners to generate a signal S[s(t)]which is a function of the received signal. This signal is then transmitted both to a delay circuit 17 or temporary store and to an integrator 18 operable to sum the values of S[s(t)](or S(t)), for each time instant t from reception of an echo pulse to a selected end point to form the signal $$c(x) = \int_{x}^{\infty} S(t)dt$$

The thus integrated signal c(x) is then combined with the delayed function S(x) to form the quotient $$\hat{S}(x) = \frac{S(x)}{C(x)}$$

in combination circuit 19, and signal $\hat{S}(x)$ is fed to a scan converter and display device 20 such as a video monitor. As discussed above the signal thus processed is substantially free from shadowing and enhancement effects without suffering from any other image degradation as a result of the further processing, allowing the clinician greater scope for interpretation of the images without the potential masking effects of the image artifacts removed by the signal processing.

Although described in the context of an ultrasonic scanner as such, the invention may also be embodied as a signal processing accessory for use in connection with existing ultrasonic scanners by extracting the signal S(t) from the scanner, processing it as described, and reintroducing the processed signals to the scanner for display.

Furthermore, although described strictly in relation to ultrasonic echoscopy in which echo amplitude is the modified parameter in the received signal, the above-described techniques of the present invention may also be applied to pulsed doppler or colour doppler techniques.

I claim:

1. An apparatus for use in association with an ultrasound scanner of a type comprising:

at least one transducer, means for generating a pulse signal to be transmitted by the transducer, which transducer receives an echo signal after reflection of the transmitted pulse signal within an object under examination to generate a received signal for producing an A-scan line which, in association with signals constituting other A-scan lines forms a B-scan signal of said object under examination, the apparatus comprising:

means for receiving the B-scan signal, means for deriving therefrom a compensation signal derived by integration of a function of the received signal over a finite time period, and means for dividing the said function of the received signal by the compensation signal to form an output B-scan signal, and output means for delivering said B-scan signal to said associated ultrasound scanner for display.

2. A method of compensating for the effects of variable attenuation in an object being scanned by an ultrasound pulse echo scanner having ultrasonic pulse transmission means for transmitting an ultrasonic pulse signal into an object under examination, ultrasonic pulse receiver means for receiving echo pulses reflected from within the object and converting them into a received signal, comprising the steps of forming a compensation signal from the received signal by summing values of a function of the received signal over time intervals commencing with each of a plurality of time instants, and generating a signal for display by dividing the function of the received signal by the compensating signal.

3. The method as defined in claim 2, in which a signal representing the function of the received signal is temporarily stored while the values of the compensation signal are determined.

4. A method as defined in claim 3, wherein the received signal is subject to variable time gain compensation before the compensation signal is derived.

5. A method as defined in claim 3, wherein the compensation signal is derived on the basis that the signal strength of the received signal at any time instant after generation is influenced by both attenuation and backscatter and that there is a relation between backscatter and attenuation effects in the medium through which the pulse is transmitted.

6. The method as defined in claim 2, in which the received signal is subject to variable time gain compensation before the compensation signal is derived.

7. A method as defined in claim 2, wherein the compensation signal is derived on the basis that the signal strength of the received signal at any time instant after generation is influenced by both attenuation and backscatter and that there is a relation between backscatter and attenuation effects in the medium through which the pulse is transmitted.

8. The method as defined in claim 2, in which the compensation signal is derived on the basis that the signal strength of the received signal at any time instant after generation is influenced by both attenuation and backscatter and that there is a relation between backscatter and attenuation effects in the medium through which the pulse is transmitted.

9. A method as defined in claim 2, in which the step of forming the compensation signal takes into account a relationship between backscatter and attenuation effects in the medium through which the pulse is transmitted.

10. A method of compensating for the effects of variable attenuation in an object being scanned by an ultrasound pulse echo scanner having ultrasonic transmission means for transmitting an ultrasonic pulse signal into an object under examination, ultrasonic pulse receiver means for receiving echo pulses reflected from within the object and for converting them into a received signal, comprising the steps of:

forming a compensation signal by summing values of a function of the received signal over time, the compensation signal being derived on the basis that the signal strength of the received signal at any time instant after generation is influenced by both attenuation and backscatter and that there is a relationship between backscatter and attenuation effects in the medium through which the pulse is transmitted, and generating a signal for display by dividing the function of the received signal by the compensating signal.

11. An apparatus for producing ultrasound images of a body under examination, comprising:

a transducer, means for generating a pulse signal to be transmitted by the said transducer, which transducer receives an echo signal after reflection within the object under examination to generate a received signal, means for applying time varied gain control to the received signal and for producing from the received signal a plurality of sequential successive A-scan signals which together constitute a B-scan signal representing the echo signals reflected from within the object under examination, and means for at least partly compensating image artifacts in the B-scan signal due to the time varied gain control applied to the received signal, the said image artifact compensating means comprising:

means for deriving a function of the received signal, means for deriving a compensation signal by integration of the function of the received signal over a finite time period, and means for dividing the compensation signal into the function of the received signal whereby to form an output signal to be applied to display means for displaying the image thus produced.

12. The apparatus as defined in claim 11, in which there are provided temporary storage means for storing a signal representing the function of the received signal, integration means for integrating the function of the received signal over a finite time period, and divider means for dividing the function of the received signal by the compensation signal to produce the output signal for application to the display means.

13. A method of operating an ultrasonic imaging system comprising the steps of:

a) transmitting ultrasonic pulses into an object under examination, b) receiving echo pulses reflected from within the object under examination, c) converting the received echo pulses into a received signal, d) generating a function of the received signal, e) deriving a compensation signal by summing values of the function of the received signal over time intervals commencing with each of a plurality of time instants, f) generating a signal for display by dividing the compensation signal into the function of the received signal, and g) subjecting the received signal to variable time gain compensation before deriving the compensation signal.

* * * * *